May 12, 1964     F. B. GATLIN ETAL     3,132,844
WIRE-ROPE-CONNECTOR PASSING SHEAVE ASSEMBLY
Filed Nov. 2, 1961     2 Sheets-Sheet 1
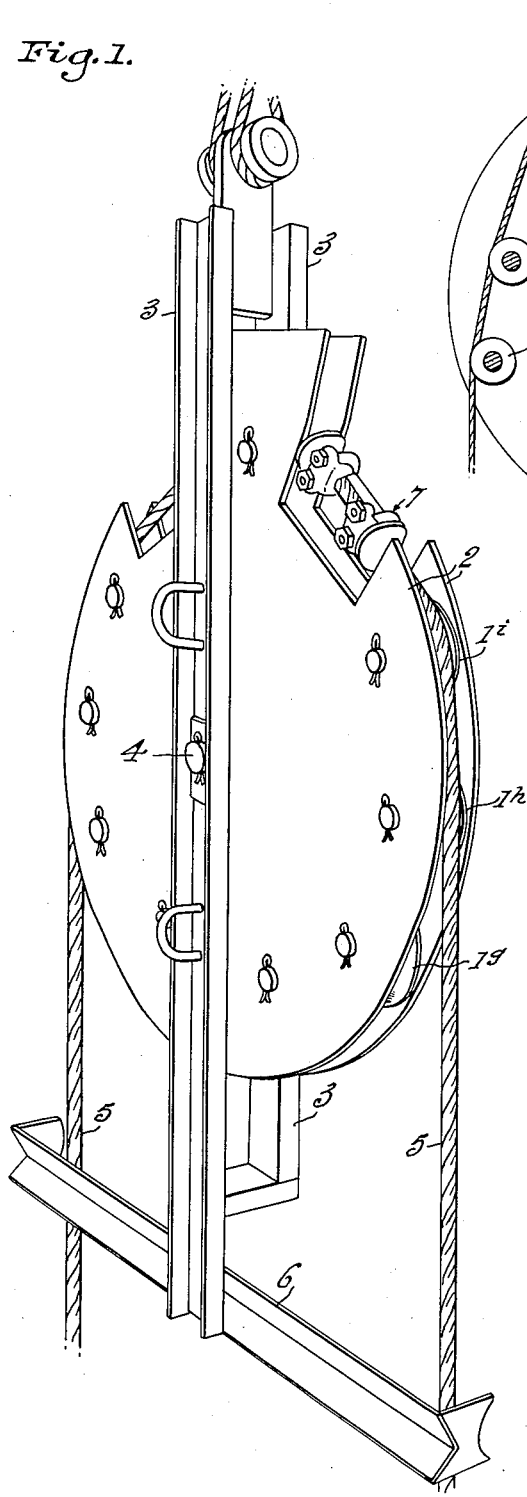
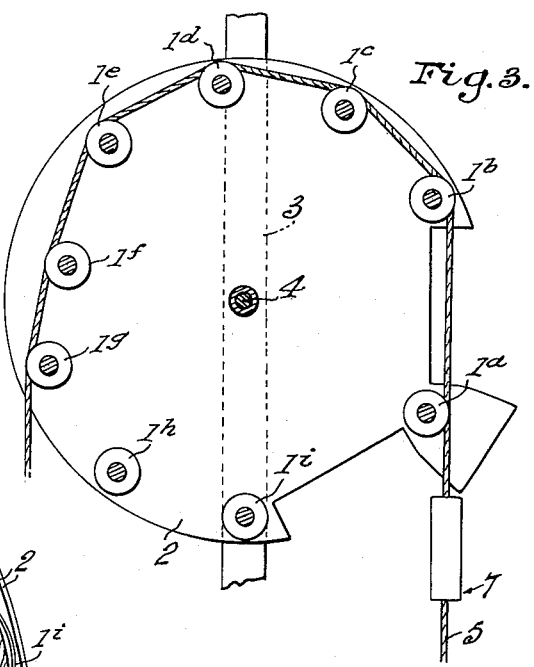
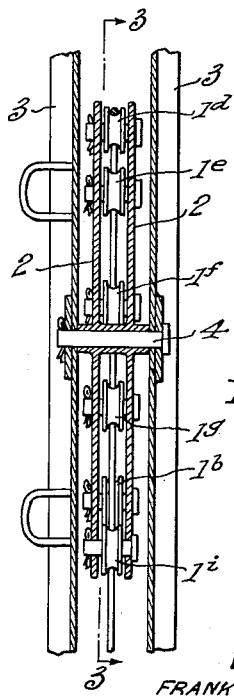
INVENTORS
FRANK B. GATLIN
WILLIAM S. GUERRANT, JR.
EDWARD J. PATTERSON, JR.
ROBERT E. SNIDER
BY
ATTORNEYS May 12, 1964 F. B. GATLIN ETAL 3,132,844
WIRE-ROPE-CONNECTOR PASSING SHEAVE ASSEMBLY
Filed Nov. 2, 1961 2 Sheets-Sheet 2

INVENTORS
FRANK B. GATLIN
WILLIAM S. GUERRANT, JR.
EDWARD J. PATTERSON, JR.
ROBERT E. SNIDER

BY
ATTORNEYS

United States Patent Office 3,132,844
Patented May 12, 1964

3,132,844
WIRE-ROPE-CONNECTOR PASSING
SHEAVE ASSEMBLY
Frank B. Gatlin, Liberty, Tex., William S. Guerrant, Jr., Annandale, Va., Edward J. Patterson, Jr., Talco, Tex., and Robert E. Snider, Fort Belvoir, Va., assignors to the United States of America as represented by the Secretary of the Army
Filed Nov. 2, 1961, Ser. No. 149,791
1 Claim. (Cl. 254—192)
(Granted under Title 35, U.S. Code (1952), sec. 266)

The invention described herein may be manufactured and used by or for the Government for governmental purposes without the pyament of any royalty thereon.

This invention relates to improvements in sheave or block assemblies whereby rope or cable with connectors affixed thereto can be utilized in a block and tackle or system of pulleys.

Briefly, this invention is an assembly comprising a series of sheaves or pulleys within a housing, which is designed to accommodate a wire-rope-connector, on the rope or cable, in such a manner that it will pass through the assembly without interfering with its continuity of action.

Previously developed block and tackle systems have, for the most part, required the use of a continuous uninterrupted line or cable. Other pulley arrangements in order to accommodate external objects attached to the line or cable, have been made with indentations in the periphery of the pulley itself, to receive and pass these objects attached to the cable, around the pulley. Such indentations in the periphery of a pulley, while satisfactory for some purposes, such as clothespins on a clothes line, have proven unsuitable for heavy duty work, inasmuch as an object affixed to a cable such as a cable clamp or wire-rope-connector, entering the pulley in a position where it does not fit exactly into the indentation, can cause the rope or cable to be thrown off the sheave, thereby creating not only inefficiency but an extremely hazardous condition.

It is therefore an object of this invention to provide, in a sheave assembly, a means of passing a wire-rope-connector or other cable or rope-borne obstruction through the assembly without regard to its continuous relative position with respect to the obstacle accommodation means in the assembly.

It is a further object of this invention to provide, in a sheave assembly having the characteristics above-described, for a distribution of weight bearing axles or pins so as to minimize the effect of friction on any one axle or pin.

Other features and advantages will appear in the description wherein:

FIG. 1 is a perspective view of one embodiment of the invention;

FIG. 2 is a central vertical section of FIG. 1;

FIG. 3 is a sectional view along the line 3—3' of FIG. 2;

Figure 4:
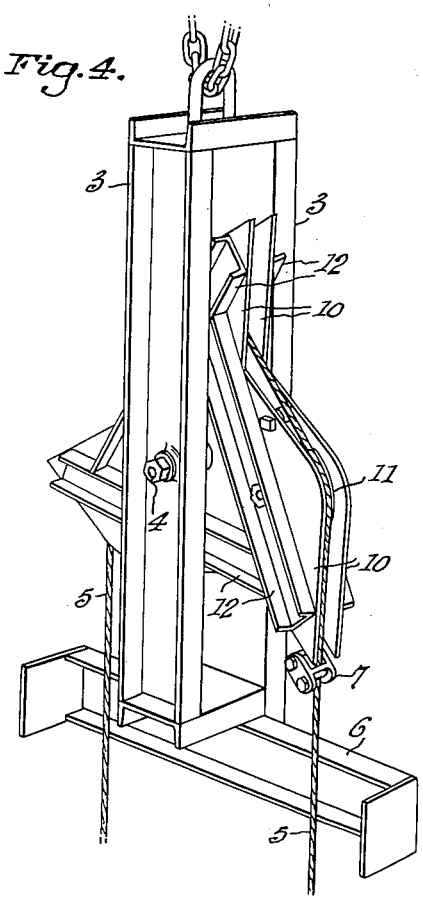
FIG. 4 is a perspective view of the second embodiment.

Referring in detail to the embodiment illustrated in FIGS. 1, 2, and 3, the sheave assembly comprises two plates 2 center mounted on pin 4 between channel members 3. Pin mounted between each of plates 2 are a series of individual sheaves 1a–1i. The normal operation of the sheave assembly is shown at FIG. 3 with the assembly in the position ready to receive wire-rope-connector 7 or other obstruction. Only when an obstruction is passing through the assembly or when the assembly is repositioning itself in the ready position do plates 2 turn on pin 4. Otherwise the plates remain stationary because of the shorter distance from the center pin of sheaves 1e, 1f, and 1g, causing a lesser moment of force than the other sheaves and holding the plates motionless. However, as wire-rope-connector 7 contacts plates 2, it causes rotation of the plates, and wire-rope-connector 7 falls into the slot between sheaves 1a and 1i, and rotates in the slot as shown in FIG. 1 until it passes through the assembly, after which the assembly returns to the position of ready as shown in FIG. 3. If the pulling direction is reversed, plates 2 will rotate until sheave 1a is again in contact with the incoming cable and the handling of the wire-rope-connector from the opposite direction will be accomplished in the same manner. The resulting positions of ready of the sheave assembly, in this embodiment, have been accomplished by carefully locating the position of sheaves 1e, 1f, and 1g. Sheaves 1e and 1g are located on an arc, the radius of which, from center pin 4, is less than that of the remaining sheaves excepting sheave 1f. Sheave 1f, located between sheaves 1e and 1g is located on an arc, the radius of which (from pin 4) is even less than the radius to sheaves 1e and 1g. Thus it is that the resulting moments of force, created by the pull and load of the rope or cable, leave the assembly in a ready position to receive the wire-rope-connector regardless of the direction from which it approaches the assembly.

T-bar fair lead 6 is designed to prevent the cable or rope from slipping the sheave assembly when it is slackened.

Figure 6:
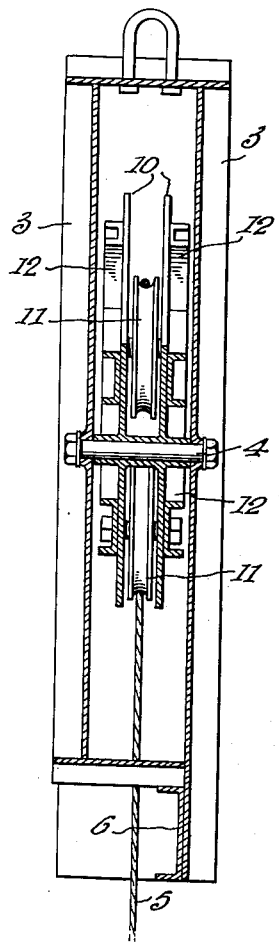
FIG. 6 is an end center sectional view of the device illustrated in perspective at FIG. 4.
Figure 5:
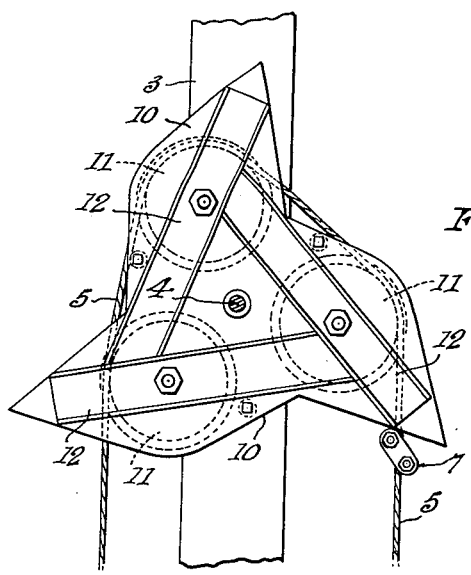
FIG. 5 is a side view of the embodiment illustrated in FIG. 4 with one channel member 3 removed therefrom.

FIGS. 4, 5, and 6 represent a second embodiment of this invention. Its principle of operation is similar to that of the first-described embodiment, though its function in reverse operation is not as efficiently accomplished. This embodiment also comprises a plurality (preferably three) sheaves 11 mounted between plates 10, further supported by channel members 12, which plates in turn are pivotally mounted on center pin 4 supported by channel members 3. The plates are so shaped as to provide a forward (toward the incoming wire or rope) extending projection at each sheave which will engage wire-rope-connector 7, thus causing the plates to turn about center pin 4 until the wire-rope-connector 7 has passed through the assembly. It will be noted that in this embodiment the projections at each sheave are so disposed as to face the cable, incoming from one direction only, in such a way that incoming connector or other obstruction will squarely engage the projection. As seen in FIG. 4, reversal of the cable will present to the incoming obstruction an engagement surface at an obtuse angle with the incoming cable. Accordingly, while this embodiment will receive wire or rope, with obstructions thereon, from either direction, it will work most efficiently where the cable enters the assembly in the direction facing squarely the plate projections. The assembly is provided with T-bar fair lead 6 designed to prevent slack in the wire or rope from causing it to leave the channel of the sheave assembly.

Other variations may, of course, be resorted to without departing from the scope of this invention.

We claim:

An obstruction passing sheave assembly comprising a pair of plates spaced apart in parallel fixed relation to one another, each of said plates having at least two corresponding obstruction accommodation slots in its periphery and obstruction engagement means therebetween; rotatable mounting means substantially at the center of each of said plates; support means for said rotatable mounting means; a plurality of sheaves pivotally mounted in spaced relation generally about the periphery of and between said plates, one of said sheaves being mounted generally between said slots, and one or more of said sheaves being so offset with respect to the remaining sheaves as to cause, through forces created in operation, said obstruction engagement means to be in position to engage an obstruction on an incoming sheave-threaded tension means.

References Cited in the file of this patent

UNITED STATES PATENTS

| | | |
|---|---|---|
| 885,455 | Drake | Apr. 21, 1908 |
| 893,906 | Drake | July 21, 1908 |
| 1,142,485 | Brown | June 8, 1915 |
| 1,559,023 | Wood | Oct. 27, 1925 |
| 1,929,417 | Fykse | Oct. 10, 1933 |
| 1,968,321 | Shope | July 31, 1934 |